July 19, 1949.    T. D. DI ADDARIO    2,476,483
DEVICE FOR SIFTING AND MEASURING FLOUR AND THE LIKE
Filed Oct. 11, 1948    2 Sheets-Sheet 1
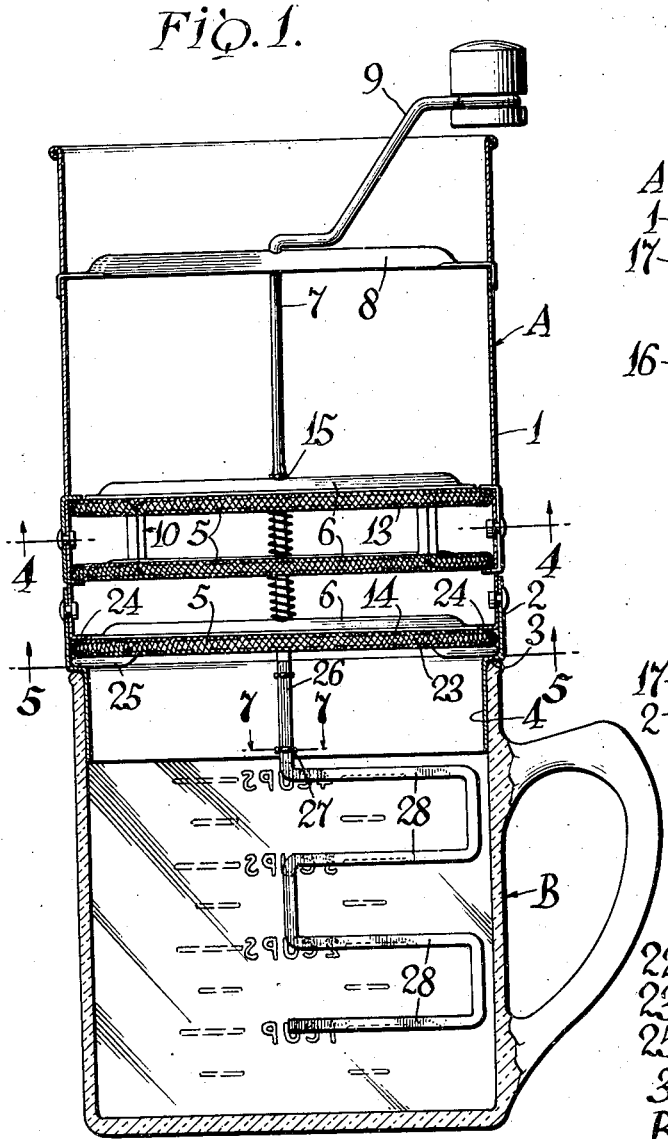
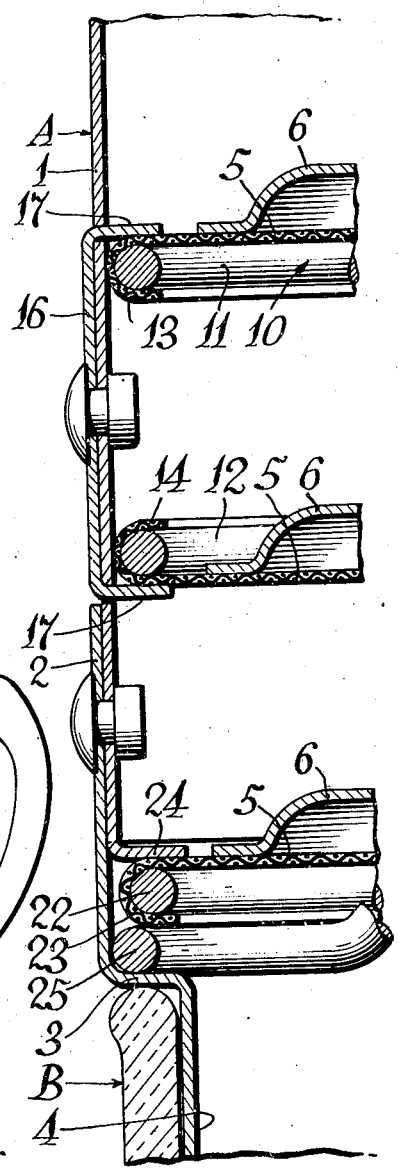
INVENTOR.
Thomas D. Di Addario,
BY John S. Powers.
ATTORNEY.

July 19, 1949.  T. D. DI ADDARIO  2,476,483
DEVICE FOR SIFTING AND MEASURING FLOUR AND THE LIKE
Filed Oct. 11, 1948  2 Sheets-Sheet 2
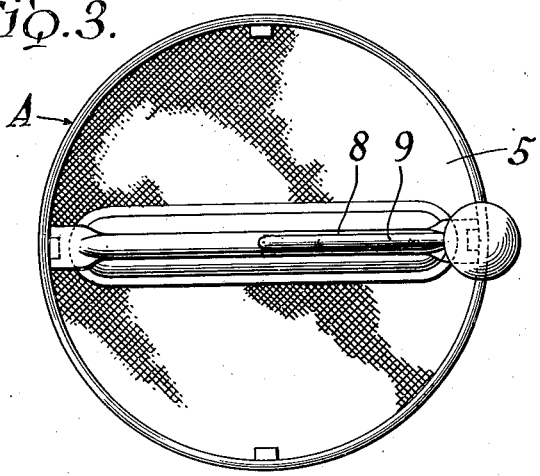
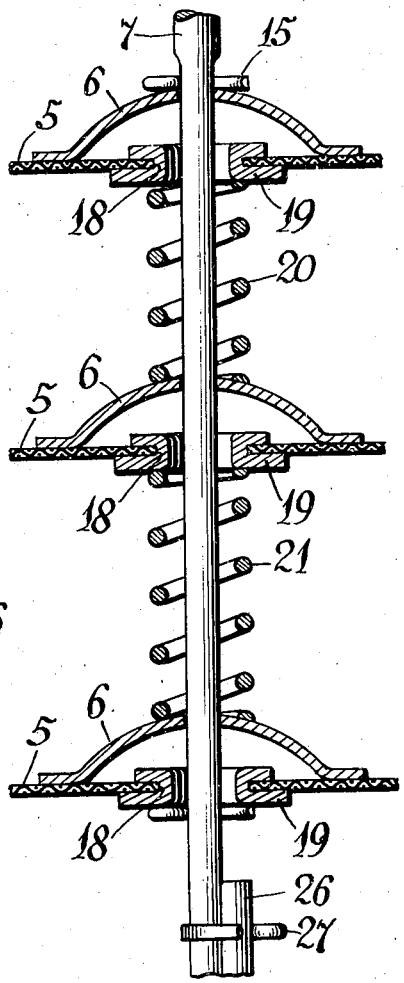
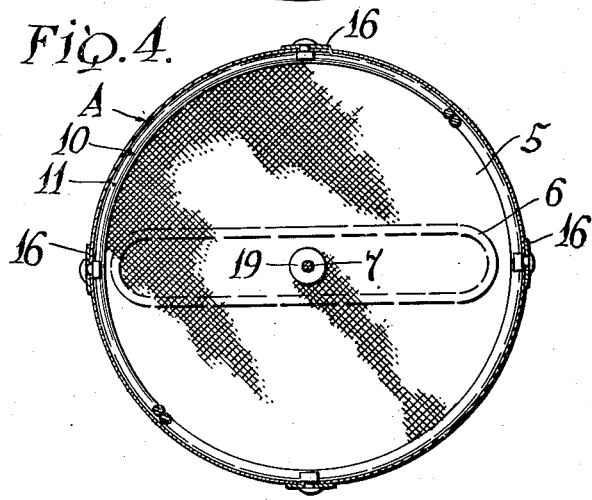
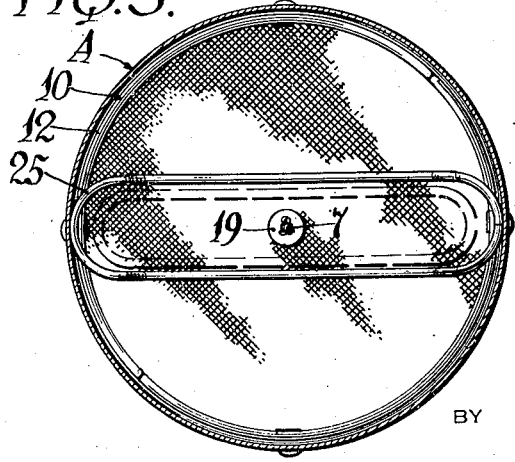
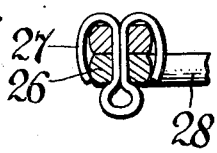
INVENTOR.
Thomas D. DiAddario,
BY John Sowers
ATTORNEY Patented July 19, 1949

2,476,483

UNITED STATES PATENT OFFICE 2,476,483

DEVICE FOR SIFTING AND MEASURING FLOUR AND THE LIKE

Thomas D. Di Addario, Buffalo, N. Y.

Application October 11, 1948, Serial No. 53,957

4 Claims. (Cl. 209—358)

This invention relates to a device for domestic use in the sifting and measurement of flour and other pulverized material required in cooking.

Many cooking recipes require such materials in terms of units of measurement, for example, "cups." These materials usually require sifting in order to eliminate lumps. In ordinary practice the housewife, when using a sifter, either discharges the flour or other powdered material into a pan, guessing at the measurement, or, refraining from the use of a sifter, discharges the material directly into a measuring cup. When a sifter is used and the material is discharged into a pan the frequent results are an inadequate amount or an overadequate amount, with impairment of savor of the cooked product, and, if the amount be overadequate, with waste of material. When a sifter is not used and the material is discharged directly into a measuring cup, the lumps are not removed and the material is not uniformly distributed or mixed with the other ingredients, the savor and quality of the cooked product thereby being impaired.

The invention overcomes these objections by the provision of a device wherein the material may be sifted, discharged directly into a measuring vessel with all lumps eliminated and an accurate measurement of the material obtained contemporaneously with its accumulation in the measurement vessel.

For this purpose the device of the invention consists generally of the combination of a sifter and measuring vessel with features by which the sieve and the measuring vessel may be assembled as a unit and other features by which the shaft which operates the distributing elements of the sifter may be combined with material leveling elements operative in the measuring vessel and the quantity of material in the measuring vessel may at all times be seen and determined in units of measure.

In the accompanying drawings:

Figure 1 is a vertical sectional view of the device with parts shown in side elevation.

Figure 2 is an enlarged fragmentary vertical section showing a preferred arrangement of the sifting screens.

Figure 3 is a top plan view.

Figure 4 is a horizontal section on the line 4—4 of Figure 4, looking in the direction of the arrows.

Figure 5 is a horizontal section on the line 5—5 of Figure 1, looking in the direction of the arrows.

Figure 6 is an enlarged fragmentary vertical section showing features of the arrangement of the screens and the distributing elements in the sifter.

Figure 7 is a detail horizontal section on the line 7—7 of Figure 1, looking in the direction of the arrows.

Figure 8 is a detail perspective view of a frame for determining the spacing of the screens of an adjacent pair.

The sifter is indicated generally at A and the measuring vessel at B. The sifter may be of any standard construction in respect to provision of the screens and the distributors and the measuring vessel may be of the usual cup-shaped form, bearing on its cylindrical surface calibrations indicative of "cups" (½ pint by volume in the sense of cook book recipes) and fractions thereof.

According to the invention the sifter casing 1, which is preferably of the usual cylindrical form, is provided with a cylindrical extension 2 formed with an inwardly projecting annular shoulder 3 and a cylindrical apron 4 depending from the shoulder 3. The shoulder 3 engages upon the upper end of the vessel B as a support and the apron 4 projects with a somewhat close fit into the vessel, centering the sifter and maintaining its stability as mounted upon the vessel.

The sifter includes the usual spaced parallel screens 5 and distributors 6 severally provided for the screens and movable over their upper surfaces. The sifter also includes the usual central vertical shaft 7 upon which the distributors are mounted, the shaft being journalled in a transverse bracket 8 having its ends suitably connected to the cylinder 1 and being provided at its upper end with an operating handle 9. The sifter shown in the drawings includes three screens 5, substantially equidistantly spaced in parallel planes, in accordance with standard practice.

While the sifter may be of any standard construction, a preferred construction is shown in the drawings. In this construction the upper two screens 5 are determinately spaced by a continuous wire frame 10, shown in detail in Figure 8, which is fashioned to provide upper and lower rings 11 and 12, the upper screen being arranged above the ring 11 and the screen next below, i. e. the intermediate screen, being arranged below the ring 12, the annular marginal portions of the screens being folded as at 13 and 14 about the rings 11 and 12, and confined, as folded, by the inner circumferential face of the casing 1. The upper distributor 6 is held in any suitable manner against the upper surface of the upper screen, for example by a cotter pin 15 passing through the shaft 7 and engaging the upper face of the upper distributor. The frame 10 is supported by clips 16 suitably secured to the casing 1 and having inwardly projecting lugs 17 against which the rings 11 and 12 bear. The portion of the shaft 7 upon which the distributors 6 are mounted is preferably flat-sided and the distributors have conforming openings whereby they may be rotated by the shaft. The screens 5 have central openings 18 through which the flat sided portion of the shaft 7 projects, the edges of the central openings of the screens being preferably reinforced by annular ferrules 19. The intermediate distributor 6 is pressed against the upper surface of the intermediate screen by a helical expansion spring 20 which bears at its upper end against the upper surface of the intermediate screen by a helical expansion spring 20 which bears at its upper end against the upper ferrule 19. The lower distributor 6 is similarly pressed against the lower surface of the lower screen by a similar spring 21.

The lower screen is held by an annular frame 22, being positioned at the upper side of this frame and having its annular marginal portion folded about it as at 23. The lower screen is confined against lugs 24 projecting inward from the lower edge of the casing 1, preferably by an elliptical frame 25, the bowed ends of which rest upon the shoulder 3 and confine the folded portion 23 of the lower screen. The side bars of the frame 25 are preferably upwardly offset in horizontal planes and provide rests or reinforcement for the lower screen against the thrust of the spring 21.

The flat sided portion of the shaft 7 projects to a suitable extent below the lower screen 5 and its projecting portion carries an extension shaft 26; the shafts 7 and 26 being suitably detachably connected, for example by cotter pins 27. The shaft 26 is formed with U-bends which provide radially extending parallel bars 28. The vessel B is marked with calibrations indicative of "cups" and fractions thereof. Assuming that the capacity of the vessel B is four cups the "cup" calibrations, reading upwardly, will be successively "1 cup," "2 cups," "3 cups" and "4 cups." The bars 28 are severally located in planes substantially coinciding with the cup calibrations.

With the sifter A and the vessel B fitted together as shown in Figure 1 a quantity of powdered material, such as flour, is poured into the upper end of the casing 1 of the sifter A. The handle 9 is turned and the distributors 6 are rotated over the surface of the screens, in order to move the material relatively to the screens whereby the material will fall successively through the several screens.

Any lumps which may not be disintegrated during the rotation of the distributors will be retained by the screens. The vessel B is constructed to permit the housewife to see the material as it falls into the vessel. For this purpose it is preferably made of transparent material. As the powdered material accumulates in the vessel the bars 28 will keep the upper surface of the material level. In this way a substantially exact determination of the quantity of material discharged by the sifter may be had at all times during its operation. If but one cup of material be desired the operation is stopped when the upper surface of the material, as levelled out by the lowermost bar 28, is in a plane coextensive with the area of the vessel B and which substantially coincides with the calibration "1 cup." Similarly if two or more cups be desired the operation of the screen is continued until the upper surface of the material as levelled off by the corresponding bar 28 is in a plane which substantially coincides with the corresponding calibration. Of course the extension shaft 26 could be formed to provide additional bars 28 in planes coincident with calibrations indicative of a fraction of a cup, i. e. "½ cup." This, however, is not deemed necessary.

When the desired quantity of material has been discharged into the vessel B the sifter is removed and the vessel B is used to pour the screened and measured material into the food mixture to be cooked.

If it is desired to use the sifter without using the measuring cup, that is to say in cases where the material is to be sifted without being measured, the extension shaft 26 may, if desired or necessary, be readily disconnected from the shaft 7 by removing the cotter pins or equivalent fastenings.

I claim:

1. A device for domestic use in the sifting and measurement of pulverized materials required in cooking, comprising, in combination, a sifter for powdered material of the type which includes a casing, enclosed screens and distributors movable over the surfaces of the screens, and a shaft for actuating the distributors, the casing being characterized by an extension formed with an inwardly projecting shoulder and an apron depending from the shoulder; a measuring vessel upon the upper end of which the shoulder has supporting engagement and into which the apron projects with a close detachable fit, thereby to center and stabilize the sifter, the measuring vessel being calibrated in terms of units of measure and being constructed to permit contemporaneous visual inspection of the calibrations and the material as discharged into it by the sifter; and an extension shaft located within the measuring vessel and connected to the shaft for actuating the distributors, the extension shaft being provided with means for effecting the leveling of the upper surface of the powdered material as discharged, in planes substantially coincident with the calibrations.

2. A device as set forth in claim 1 wherein the means for effecting the leveling of the upper surface of the powdered material consists of bars projecting radially from the extension shaft in parallel planes.

3. A device as set forth in claim 1 wherein the shaft for actuating the distributors has a portion which projects into the apron and to which the extension shaft is detachably connected.

4. A device as set forth in claim 1 wherein the shaft for actuating the distributors has a portion which projects into the apron and to which the extension shaft is detachably connected and the means for leveling the upper surface of the powdered material consists of bars projecting radially from the extension shaft in parallel planes.

THOMAS D. DI ADDARIO.

REFERENCES CITED

The following references are of record in the file of this patent:

UNITED STATES PATENTS

| Number | Name | Date |
|---|---|---|
| 1,354,415 | Nepstad | Sept. 28, 1920 |
| 1,631,105 | Nall | May 31, 1927 |
| 2,281,727 | Stewart | May 5, 1942 |

FOREIGN PATENTS

| Number | Country | Date |
|---|---|---|
| 15,938 | Sweden | Dec. 13, 1902 |